US008045716B2

(12) United States Patent
Carr

(10) Patent No.: US 8,045,716 B2
(45) Date of Patent: *Oct. 25, 2011

(54) SYSTEM AND METHOD FOR THE CONCEALMENT OF DEVICE INPUT PARAMETERS

(75) Inventor: Jeffrey D. Carr, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/485,416

(22) Filed: Jun. 16, 2009

(65) Prior Publication Data

US 2009/0254744 A1     Oct. 8, 2009

Related U.S. Application Data

(63) Continuation of application No. 09/900,224, filed on Jul. 6, 2001, now Pat. No. 7,548,622.

(60) Provisional application No. 60/216,588, filed on Jul. 7, 2000.

(51) Int. Cl.
*H04L 9/08* (2006.01)

(52) U.S. Cl. .......... 380/278; 713/150; 713/152; 380/44; 380/255; 380/277

(58) Field of Classification Search .................. None
See application file for complete search history.

(56) References Cited

U.S. PATENT DOCUMENTS

| | | | |
|---|---|---|---|
| 4,864,615 A | 9/1989 | Bennett et al. | |
| 4,897,785 A | 1/1990 | Zuger | |
| 5,371,499 A | 12/1994 | Graybill et al. | |
| 5,412,730 A | 5/1995 | Jones | |
| 5,586,185 A | 12/1996 | Shibata et al. | |
| 5,710,816 A | 1/1998 | Stork et al. | |
| 5,903,653 A | 5/1999 | Ross et al. | |
| 6,118,873 A | 9/2000 | Lotspiech et al. | |
| 6,378,072 B1 | 4/2002 | Collins et al. | |
| 6,389,532 B1 | 5/2002 | Gupta et al. | |
| 6,732,179 B1 | 5/2004 | Brown et al. | |
| 6,742,116 B1 | 5/2004 | Matsui et al. | |
| 6,754,738 B2 | 6/2004 | Brice et al. | |
| 6,775,281 B1 | 8/2004 | Brown | |
| 6,888,944 B2 * | 5/2005 | Lotspiech et al. | 380/278 |

OTHER PUBLICATIONS

Communication with European Search Report for EP Application No. 01250253.0, Jul. 10, 2003.
Menezes et al., XP002245801, Data Integrity and Message Authentication, Handbook of Applied Cryptography, 1997, pp. 359-361, 497-499, 552 and 568-569, CRC Press, USA.
Raman, Anand, The Katapayadi Formula and the Modern Hashing Technique, 1997, IEEE, pp. 49-52.
Ragab et al., An Efficient Message Digest Algorithm (MD) for Data Security, 2001, IEEE, pp. 191-197.
Xie et al., Enhanced Multiple Huffman Table (MHT) Encryption Scheme Using Key Hopping, 2004, IEEE, pp. 568-571.
Arnold et al., The IBM PCIXCC: A new cryptographic coprocessor for the IBM eServer, 2004, IBM Journal of Research and Development, pp. 475-487.

* cited by examiner

*Primary Examiner* — Pramila Parthasarathy
(74) *Attorney, Agent, or Firm* — McAndrews, Held & Malloy, Ltd.

(57) ABSTRACT

A system and method for concealing input parameters that are being loaded into a device. In one embodiment, the system provides a transformed interface, in which a device into which the parameters are loaded contains a series of inverse transformation keys. The parameters to be concealed are transformed using a particular key, along with a transformed index value to indicate the particular key that must be used to inversely transform the parameter.

9 Claims, 6 Drawing Sheets

US 8,045,716 B2

SYSTEM AND METHOD FOR THE CONCEALMENT OF DEVICE INPUT PARAMETERS

CROSS-REFERENCE TO RELATED APPLICATIONS/INCORPORATION BY REFERENCE

The present application is a CONTINUATION of U.S. application Ser. No. 09/900,224, filed Jul. 6, 2001. Said U.S. application Ser. No. 09/900,224 makes reference to, claims priority to and claims benefit from U.S. Application No. 60/216,588, filed Jul. 7, 2000.

The above-identified applications are hereby incorporated herein by reference in their entirety.

FIELD OF THE INVENTION

The present invention relates to the transmission of data in a secure manner and, more particularly, to systems and methods that conceal parameters that are transmitted between two devices.

BACKGROUND OF THE INVENTION

The widespread transmission of digital data across computer networks and between transmission and reception devices has created a need for increasingly efficient systems for the encryption and decryption of sensitive data. There exist known systems that employ encryption algorithms which encrypt digital data into an unintelligible form for transmission over non-secure communication channels. One such encryption algorithm is known as the Data Encryption Standard (DES). The DES method of encryption utilizes a data encryption key which consists of a 64-bit binary word. The key is used in a mathematical algorithm which coverts digital data into an apparently random sequence of bits. The encryption key must be known to the receiver of the encrypted data, because the key is required to properly decrypt the encrypted data.

In the conventional DES system, since the encryption and decryption algorithms are publicly known, the security of the key is crucial if the data is to be protected. Thus, others have proposed the periodic generation and distribution of random DES keys. The DES users typically change keys at frequent intervals, such as on a daily basis.

Such a DES system requires that personnel on both the transmission and reception end know which key is being used on a particular day. Such an approach is disadvantageous, because the more people who know the key being used, the more likely that unauthorized people will discover the key as well, and therefore be able to intercept and interpret data that is intended to be maintained in secrecy.

Thus, the need exists for an improved system and method for concealing parameters that are being loaded into a device. The present invention addresses this need.

SUMMARY OF THE INVENTION

In one aspect of the invention, a method is provided for concealing a parameter transferred between a first and second device. The method comprises generating by the first device a control signal and a parameter signal; transmitting by the first device to the second device the control signal and the parameter signal; receiving by the second device from the first device the control signal and the parameter signal; and generating by the second device a destination parameter signal using the control signal and the parameter signal.

In another aspect of the invention, the first device generates a first key signal using the control signal and generates the parameter signal by transforming a source parameter signal using the first key signal. The second device, upon receiving the parameter signal, generates a second key signal using the control signal and generates the destination parameter signal by transforming the parameter signal using the second key signal.

The another aspect of the invention, a portion of the control signal is transformed with the source parameter signal to generate the parameter signal. The second device, upon receiving the parameter signal, generates from the parameter signal using the second key signal a transformed control signal portion and compares the transformed control signal portion to a portion of the received control signal.

In another aspect of the invention, the parameter signal includes a plurality of transformed data signals and a block of transformed memory address signals corresponding to the transformed data signals.

In another aspect of the invention, a second device is authenticated by a first device. The first device generates a message signal and transmits the message signal to the second device. The second device transforms the message signal into a first transformed message signal using a configuration signal. The second device transmits to the first device the first transformed message signal. The first device transforms the message signal into a second transformed message signal using the configuration signal and compares the first and second transformed message signals to determine the authenticity of the second device.

In another aspect of the invention, a device is provided for transforming a plurality of parameter fragment signals transmitted from a first device into a destination parameter signal. The device includes logic blocks for receiving from the first device the plurality of parameter fragment signals and generating a destination parameter signal from the plurality of parameter fragment signals.

DETAILED DESCRIPTION OF THE INVENTION

Figure 1:
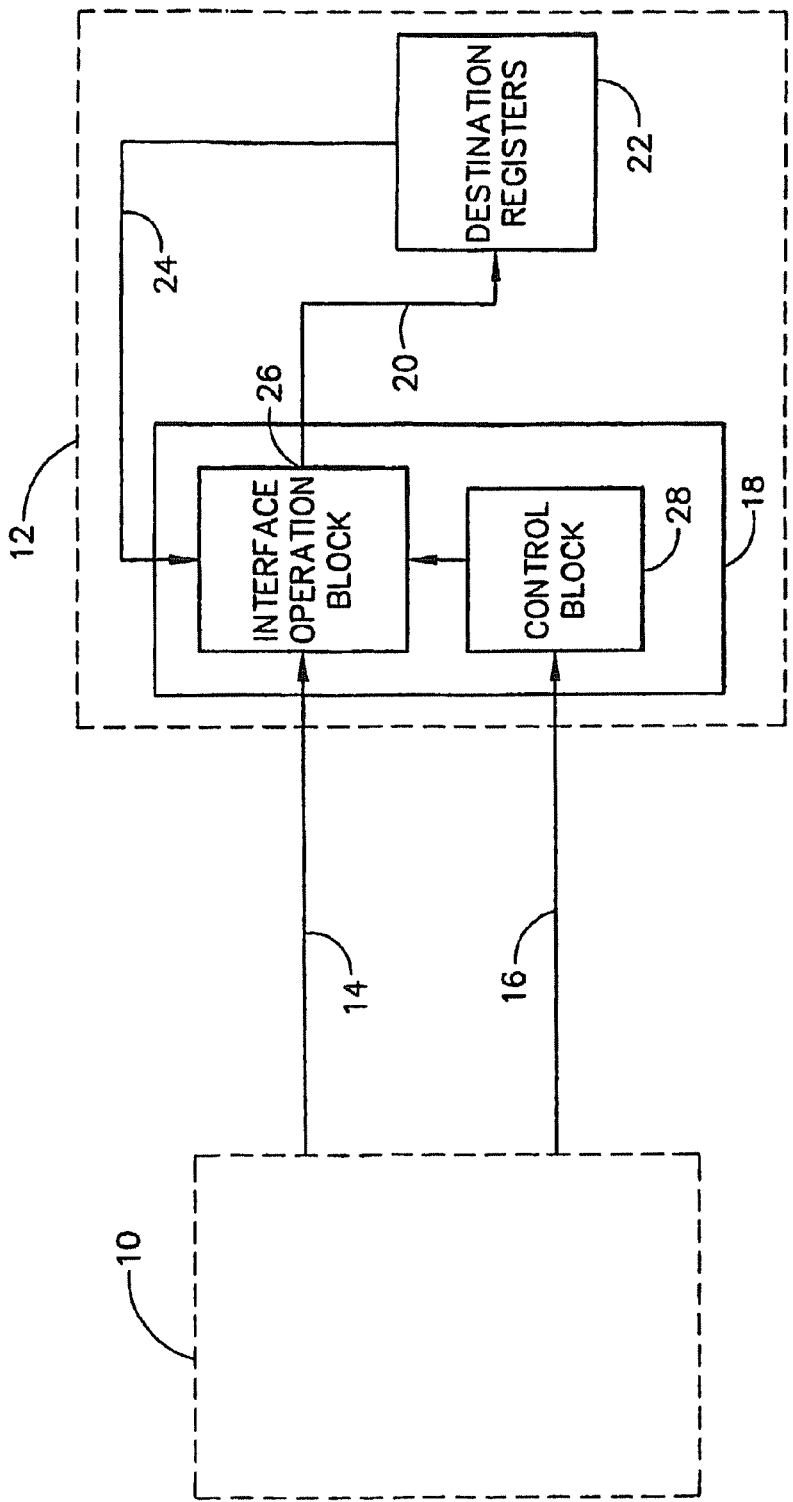
FIG. 1 is a block diagram of a system according to an embodiment of the present invention.

FIG. 1 is a block diagram of a parameter concealment embodiment of the present invention. A first device 10 generates and transmits a parameter signal 14 and a control signal 16 to a second device. The second device includes a parameter concealment logic block used to conceal device input parameters passed between the two devices. The parameter concealment logic block receives the parameter signal and the control signal and performs a transformation on the parameter signal according to the control signal in order to generate a destination parameter signal 20. The destination parameter signal is transmitted to destination registers 22 within the device. In one embodiment of a parameter concealment logic block according to the present invention, the destination parameter signal in the destination registers is transmitted as a feedback signal 24 to be reused in the parameter concealment logic block.

In one embodiment of a parameter concealment logic block according to the present invention, the parameter concealment logic block includes a control logic block 28 operably coupled to an interface operation logic block 26. The control logic block receives the control signal and directs the operations of the interface operation logic block to generate the destination parameter signal from the parameter signal.

Figure 7:
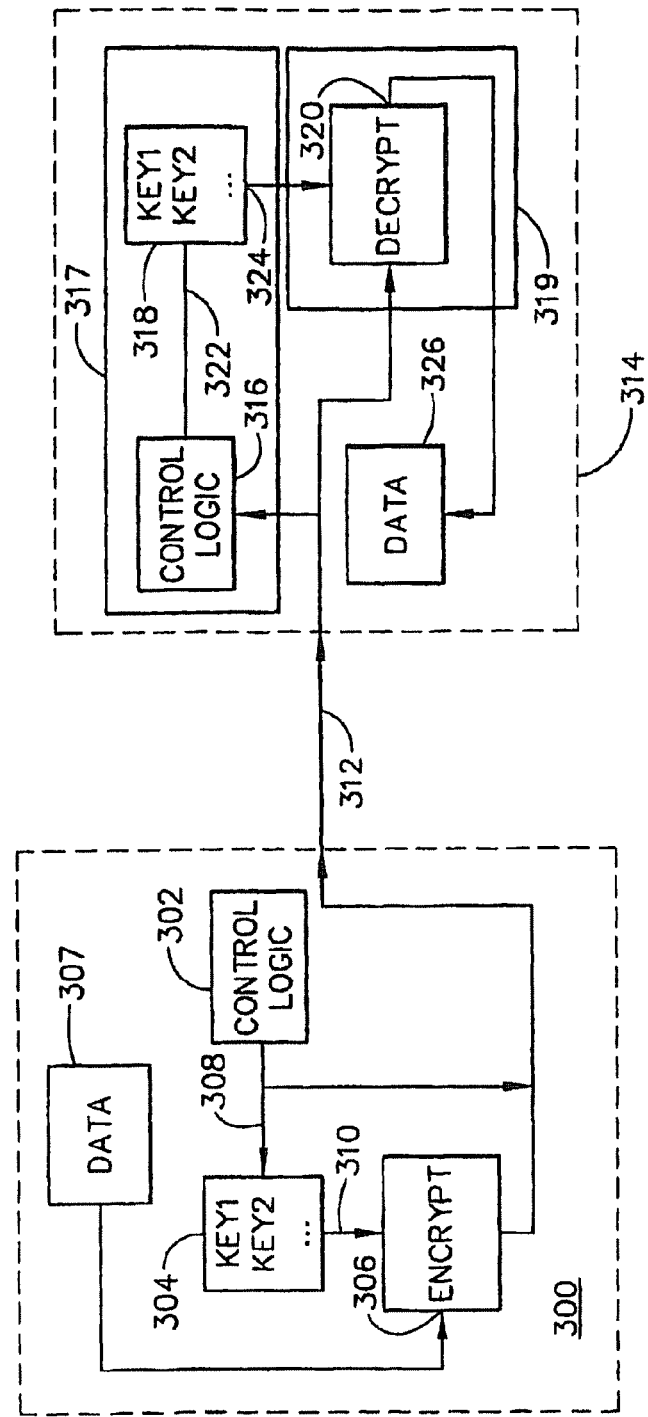
FIG. 7 is a block diagram of an embodiment of the present invention depicting communication between two devices.

FIG. 7 is a block diagram of an exemplary embodiment of a device according to the present invention. A first device 300 includes control logic 302 operably coupled to a hardware-based transformation module 306 and a first key table module 304 including indexed transformation keys. A second device 314 includes a parameter concealment logic block including a control logic block 317 operably coupled to an interface operation logic block 319. The control logic block includes second control logic 316 and a second key table module 318. The interface operation logic block includes a hardware-based transformation inversion module 320.

In operation, the first control logic uses control signals to generate first key selection signals 308 transmitted to the key table module. In response to the key selection signals, the key table module generates a key signal 310 used by the transformation module to transform source parameter signals 307 thereby generating parameter signals 312 to be transmitted to the second device. The parameter signals and control signals are transmitted to the second device.

The second device receives the parameter signals and the control signals. The second control logic extracts the control signals and uses them to generate a second key selection signal 322 transmitted to the second key table module. In response to the second key selection signal, the second key table module 318 generates a second key signal 324 transmitted to the inverse transformation module. The inverse transformation module uses the second key signal to inversely transform the parameter signals and generate a destination parameter signal 326 for use by the second device.

The process of transformation of the source parameter signal may be accomplished by a variety of methods. In one embodiment of a parameter concealment apparatus according to the present invention, the source parameter signal is transformed by being encrypted to generate the parameter signal transmitted from the first device to the second device. The inverse transformation applied to the parameter signal by the second device is then a decryption process. In another embodiment of a parameter concealment apparatus according to the present invention, the parameter signal is transformed by using hashing functions. In another embodiment of a parameter concealment apparatus according to the present invention, the parameter signal is transformed by partitioning the source parameter into parameter fragments and transmitting the parameter fragments. Any transformation in conjunction with an appropriate inverse transformation may be used to conceal the source parameter signal.

In one embodiment of a parameter concealment apparatus according to the present invention, the control signals and the parameter signals are transmitted through the same communications channel.

In one embodiment of a parameter concealment apparatus according to the present invention, the control signals and the parameter signals are transmitted through different communications channels.

Figure 2:
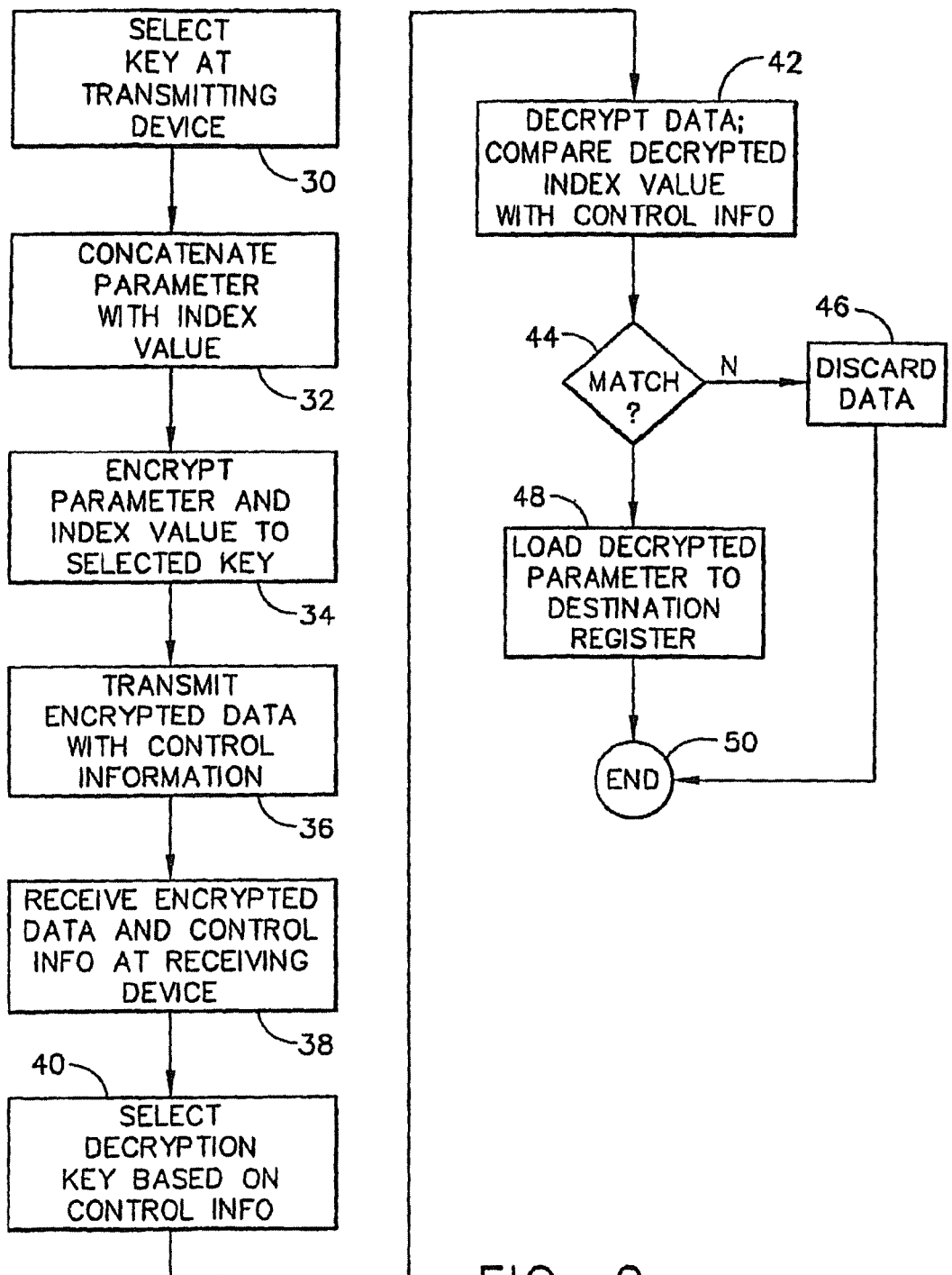
FIG. 2 is a process flow diagram of an embodiment of a parameter concealment process according to the present invention.

FIG. 2 is a process flow diagram of an embodiment of a parameter concealment process employed by the device in FIG. 7. Operation begins at step 30, with a first key signal being selected by a first device 300 (FIG. 7). At step 32, a source parameter signal to be concealed is concatenated with a control signal including an index value corresponding to the first key signal. The concatenated signal thus contains a source parameter signal portion and a control signal portion before the concatenated signal is transformed. At step 34, the concatenated signal is transformed using the first key to create a parameter signal.

At step 36, the first device transmits the transformed parameter signal, along with corresponding control signal. In one illustrative embodiment, the control signal includes an index value of the first key, as well as a final destination of a destination parameter. The final destination may be signaled using a control register value or other suitable value.

At step 38, the second device 314 (FIG. 7) receives the parameter signal and the control signal. The control signal is routed to control logic block 317 (FIG. 7), where at step 40 the control signal is processed to determine both a second key used to inversely transform the incoming transformed data, as well as the final destination of the inversely transformed data. The control logic block uses the index value to find an appropriate match in an association table or the like. The association table links the index values with corresponding keys.

Once the second key is identified, operation proceeds to step 42, and the transformed parameter signal is inversely transformed by interface operation logic block 319 (FIG. 7) to generate a destination parameter signal. The inversely transformed index value signal is compared with the index value signal received by control logic block. At step 44, the second device determines whether the two index value signals match. If not, the destination parameter signal is discarded at step 46, and operation terminates at step 50. On the other hand, if the two index value signals do in fact match, then operation proceeds to step 48, and the destination parameter is loaded to a particular destination register as dictated by the control logic block and the control signal received by the control logic block. Operation then terminates at step 50.

In one illustrative embodiment of the present invention, a method is provided for obscuring a parameter that must be passed from software to a hardware device (e.g., to a hardware decryption device). For example, when a decryption key is to be passed from software to hardware, it is desirable to prevent a monitoring software operation from being able to easily intercept the secret parameter.

In connection with this embodiment, software at the transmission end executes a plurality of interface operations to the hardware device (the receiving end), with the interface operations being executed in disjoint program modules so as to obfuscate the key building algorithm through the generation of multiple parameter fragment signals. Additionally, the interface operations may be intermixed with interface operations for other parameter destinations to further obscure the procedure.

Figure 3:
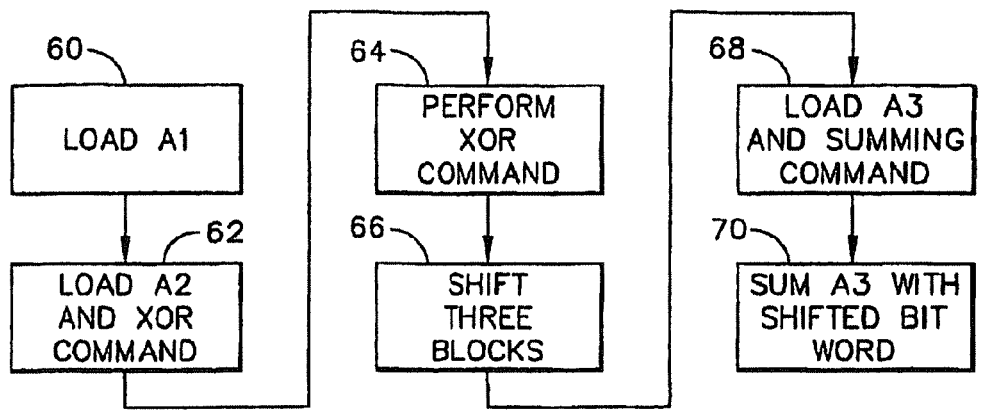
FIG. 3 is a process flow diagram of an embodiment of a parameter concealment process according to the present invention

Referring to FIG. 3, one example of the illustrative embodiment is described. For example, in the case of a key building algorithm, the key may be built in a second device by:

$$Key=(\{(A1)XOR(A2)\}<<3)+A3$$

Where A1, A2, and A3 are parameter fragment signals transmitted from a first device and used by the second device to generate a key.

Thus a first step, shown as step 60 in FIG. 3, is to load a multi-bit data word A1 (hereinafter "data word") into the second device. An interface operation logic block 18 stores A1 to a destination registers. At step 62, a data word A2 is loaded into the second device, along with an XOR command. Interface operation logic block retrieves A1 and performs the XOR function at step 64, and stores the result in another destination register. Next, at step 66, a shift command is loaded into the second device, which performs a shift function on the stored data word. At step 68, A3 is loaded into the second device, along with a command to add A3 to the shifted data word. At step 70, the second device sums A3 and the shifted data word to complete the secret key.

In this manner, the key is never seen outside of the device and is therefore protected at all times.

It will be apparent to those having skill in the art that the above-described example is only one example of the method according to the invention. Virtually any secret parameter can be built by practicing the above-described method.

It will be understood that the various loads may be performed in a sequential fashion, or alternatively can be intermixed with other interface operations to further obfuscate the operation and make it even harder for an unauthorized person to monitor the transmission line, intercept the disjoint functions and build the key.

Figure 4:
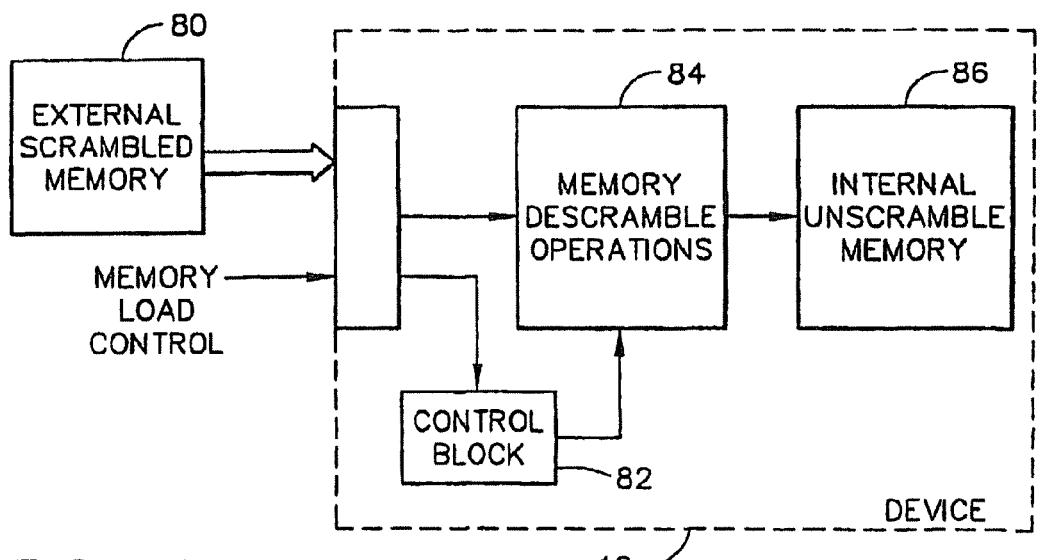
FIG. 4 is a block diagram of an embodiment of the present invention used for memory addressing.

Referring to FIG. 4, there is shown one example of the above-described method for obfuscating a secret parameter. An external addressable memory 80 is provided. When data is loaded into external memory 80, it is loaded in a manner that scrambles the original data, as well as scrambling the original address locations of that data. The scrambling of the data and the address locations is dictated by a known routine. Thus, when an external processor reads the scrambled data, it is read in a sequential manner, from the top of the memory down. Thus, when the data is loaded into the receiving device, it is loaded in a sequential manner according to how it is ordered in the external memory. In addition to data signals, memory load control signals are loaded into the device, and are received by a control logic block 82. A control logic block 82 is connected to a memory unscramble operation logic block 84, controlled by a control logic block 82 to perform the appropriate unscrambling of the incoming data signals. Once the data signals are unscrambled and address locations are determined, the data signals are stored in an internal memory 86. The unscrambled data signals can then be used directly from internal memory (such that the unscrambled memory is never transmitted outside of the device), or may be transferred across a secure interface. Thus, even if someone is able to monitor the interface between the external memory and the device, they still cannot assemble the data signals in the proper order.

Figure 5:
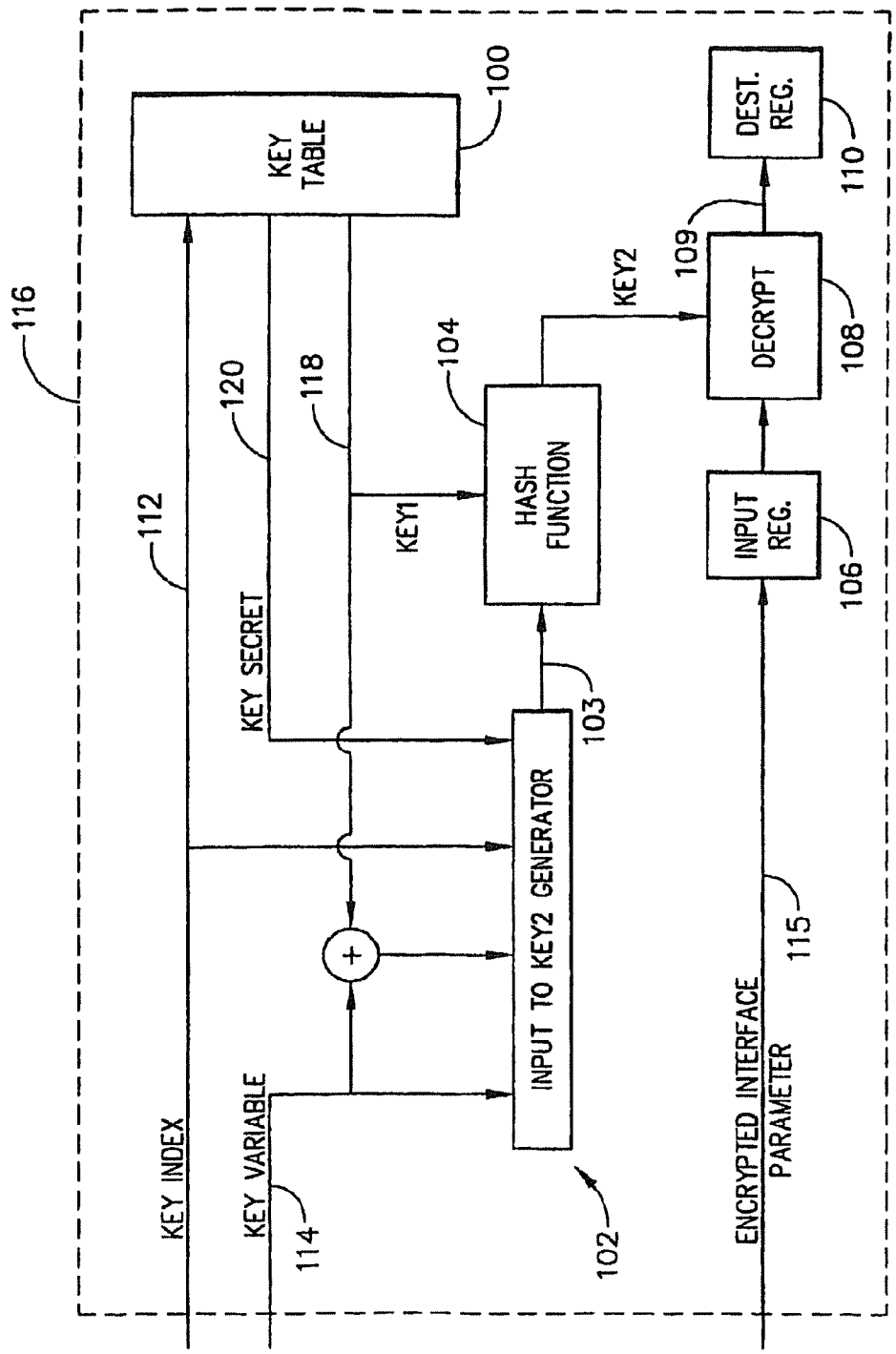
FIG. 5 is a block diagram of an embodiment of the present invention illustrating the use of a key fragmenting embodiment.

Referring now to FIG. 5, there is shown one illustrative embodiment of the invention, which allows a user to locally transform keys in a real-time manner before loading them into a hardware device (the receiving device). According to this embodiment, an intermediate key ("Key1") is used to generate a second key ("Key2") that is used by the receiving device to inversely transform an incoming, transformed interface parameter. Since the algorithm used to generate Key2 from Key1 is maintained within the receiving device, even if Key2 is compromised, it will not compromise the source secret key Key1. Key1 is maintained within the device and does not need to be transmitted between the transmitting and receiving devices.

According to the embodiment of FIG. 5, a control signal including a key index signal 112 and a key variable signal 114 are transmitted from a first device (not shown) and received by a second device 116. The second device uses the key index signal to access a key table 100 and generate a corresponding first key signal 118 as well as an intermediate key signal 120.

In one embodiment, the key index signal, the intermediate key signal, and the key variable signal encode multi-bit data values. The multi-bit data values allow for selection between a plurality of different keys stored at the second device. The intermediate key signal multi-bit value may be a fixed data word or may be a variable depending on the key index signal received by the second device.

In one embodiment, a key interface stage 102 receives the key variable signal, the key index signal, and the intermediate key signal, and integrates those values together to generate a data word signal 103. In addition, in one illustrative embodiment the key variable and key signals are summed together and also integrated into the resultant data word signal.

The data word signal is introduced, along with the first key signal, to a hash function module 104, which is a mathematical function which takes the two signals and converts them into a second key signal encoding a fixed-length binary sequence. Such a hash function may be a one-way hash function. The second key signal is then used to inversely transform the incoming parameter signal 115, which is initially stored in an input register 106, then inversely transformed using the second key signal at stage 108 to generate a destination parameter signal 109 which is stored in a destination register 110. It will be understood that the second key signal will remain the key signal that is used to conceal the interface parameter at the transmitting end until another second key signal is generated.

In this manner, even if the security of Key2 is compromised, one still cannot determine the algorithm that created Key2, nor can one determine the secret key Key1. Moreover, by simply changing the key index value, a different Key1 is selected, which will result in a different Key2 being generated. Further, even if one can intercept the key index value and also determine Key2, by simply changing the key variable value, the same key index value can still be used, as a different Key2 will be generated. Thus, if an unauthorized person is able to acquire Key2, the system is able to quickly generate a different Key2, even using the same Key1.

While in one illustrative embodiment the key interface stage 102 receives as inputs the key variable signal, the key secret signal, and the first key signal, it will be apparent that the key interface stage may receive all or some of those signals. In addition, the manner in which the inputs are integrated may take any suitable form. Moreover, the key interface stage 102 may integrate one or more of those inputs with one or more fixed data words. Thus, the embodiment shown in FIG. 5 is meant to serve as one example of such a system.

The system and method of FIG. 5 allow for different receiving devices to use different Key2 values. Thus, even if an unauthorized person is able to determine a Key2 value used by one box, that Key2 value will not necessarily work to inversely transform incoming data in other receiving devices.

Figure 6:
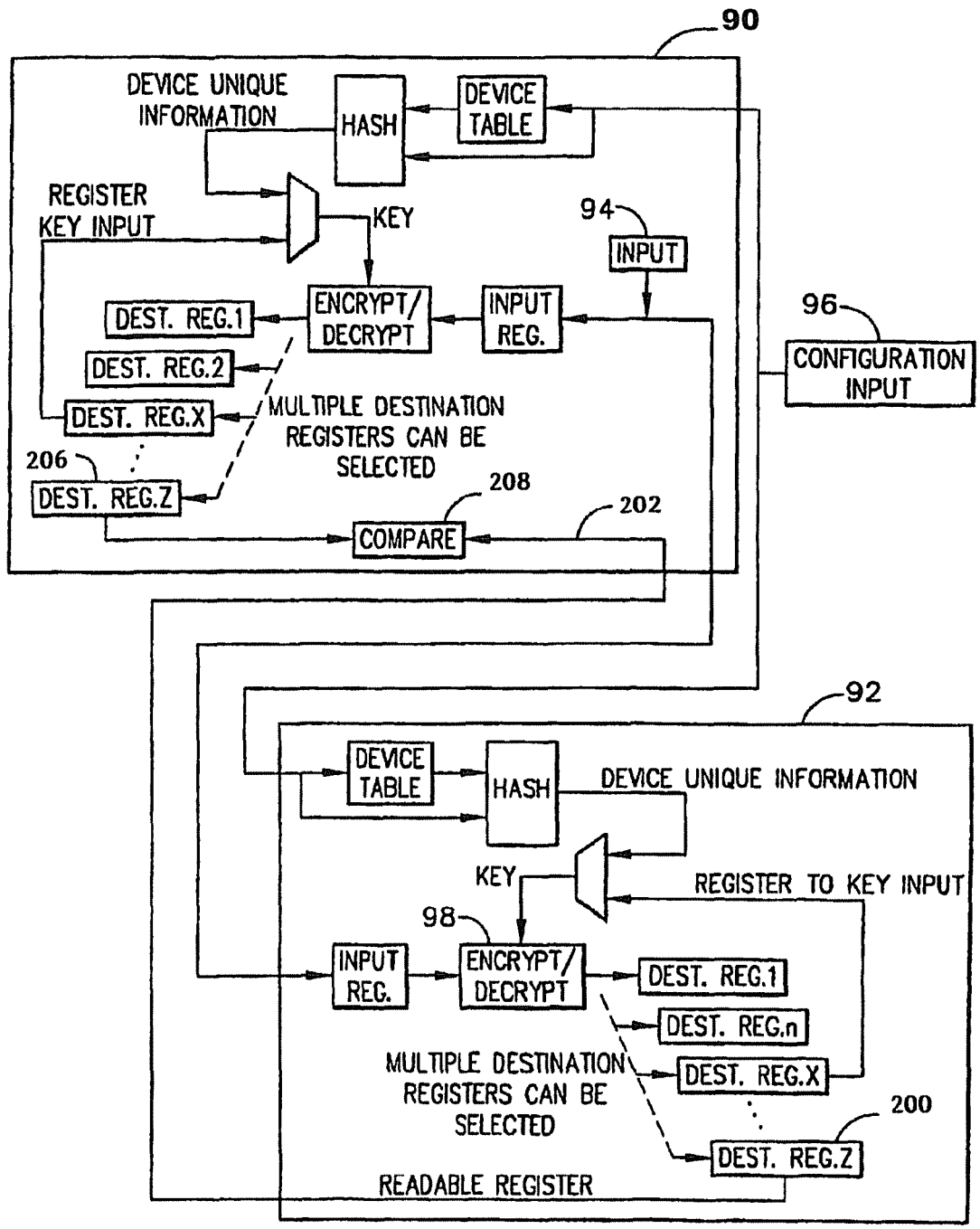
FIG. 6 is a block diagram of an embodiment of the present invention used for device authentication.

FIG. 6 illustrates an exemplary embodiment of the invention used for device authentication. Multiple destination registers, including registers for storing derivative values used for feedback as a Key2 value, are included within a device. A derivative key used as a Key2 value is used to generate a result and send the result to a destination register. The result is subsequently read from the device and transmitted to another device. This enables the invention to be used as a means of device authentication.

More specifically, a first device 90 generates a random message signal 94 transmitted to a second device 92. A predefined configuration signal 96 is used by the second device to generate 98 a first transformed message signal, storing the first transformed message signal in a first destination register 200. The first transformed message signal stored in the destination register is transmitted 202 to the first device and stored in a compare register 208.

The first device uses the predefined configuration signal 96 and the generated random message signal 94 to create a second transformed message signal stored in a second destination register 206 in the first device. The first device compares the first and second transformed message signals to authenticate the identity of the second device. If the first and second transformed message signals are the same, then the second device has proven itself by using the same transformation function as the first device. If the first and second transformed message signals are different, then the second device failed to use the same function and the second device's identity is suspect.

From the foregoing, it will be apparent to those skilled in the art that the system and method of the present invention provide for concealing the loading of parameters into a device.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A method for concealing data, comprising:
    receiving a first portion of a control signal and a transformed parameter signal, the first portion of the control signal including a key index signal and a key variable signal, the transformed parameter signal including a second portion of the control signal;
    using the first portion of the control signal to inversely transform the transformed parameter signal;
    generating an intermediate key signal using the key index signal and a key table;
    generating the second key signal using the intermediate key signal and the key variable signal;
    generating a destination parameter signal based on a comparison of the first portion of the control signal and the inversely transformed second portion of the control signal; and
    inversely transforming the transformed parameter signal using the second key signal.

2. The method according to claim 1, wherein generating the second key signal comprises generating the second key signal by using a key interface that receives the key index signal, the key variable signal, and the intermediate key signal.

3. The method according to claim 1, wherein generating the second key signal comprises generating the second key signal by using a key interface that receives the key index signal, the key variable signal, the intermediate key signal, and a result of one or more logic operations involving the key variable signal.

4. The method of claim 1, comprising generating the second key signal from the intermediate key signal and the key variable signal using a hash function.

5. An apparatus for concealing data, comprising:
    a controller configured to receive a control signal and a transformed signal, wherein the control signal includes a key index, and wherein the transformed signal includes a transformation of a parameter signal and a portion of the control signal;
    a key table arrangement that comprises indexed cryptographic keys, wherein the key table arrangement is operatively coupled to the controller, and wherein the key table arrangement is configured to generate an intermediate key signal using a key index signal received from the controller;
    a key interface operatively coupled to the key table arrangement and the controller, the key interface configured to generate a key signal using the intermediate key signal received from the key table arrangement and a key variable signal received from the controller; and
    an inverse transformer operatively coupled to the key interface and the controller, wherein the inverse transformer is configured to generate a destination signal by inversely transforming the transformed signal using the key signal received from the key interface.

6. The apparatus of claim 5, comprising:
    a second interface operatively coupled to the control controller, wherein the second interface is configured to inversely transform the transformed signal in accordance with the key index signal to generate a destination signal.

7. The apparatus of claim 5, comprising a hash circuit operatively coupled to the key interface, wherein the hash circuit is configured to generate the key signal from the intermediate key signal and the key variable signal.

8. The method of claim 5, wherein the control signal comprises a key index, and wherein the portion of the control signal comprises the key index signal.

9. The apparatus of claim 5, wherein the portion of the control signal comprises the key index.

* * * * *